United States Patent [19]

Costas et al.

[11] Patent Number: 4,903,154
[45] Date of Patent: Feb. 20, 1990

[54] AUTOMATIC DISKETTE STACK LOADER

[76] Inventors: Dan N. Costas, 48387 Hackberry St., Fremont, Calif. 94535; Larry W. Robertson, 2737 Burlingame Way, San Jose, Calif. 95121

[21] Appl. No.: 339,902

[22] Filed: Apr. 17, 1989

Related U.S. Application Data

[63] Continuation of Ser. No. 57,937, Jun. 2, 1987, abandoned.

[51] Int. Cl.$^4$ .................... G11B 17/12; G11B 15/68
[52] U.S. Cl. .................... 360/98.04; 360/92; 360/98.06
[58] Field of Search ............ 360/92, 91, 98.04–98.06, 360/97.01, 71

[56] References Cited

U.S. PATENT DOCUMENTS

| | | | |
|---|---|---|---|
| 4,510,542 | 4/1985 | Aggeler | 360/98 |
| 4,654,732 | 3/1987 | Mesher | 360/98 |
| 4,665,455 | 5/1987 | Mesher | 360/98 |
| 4,688,124 | 8/1987 | Scribner et al. | 360/98 X |
| 4,693,659 | 9/1987 | Burke et al. | 414/131 |

*Primary Examiner*—John H. Wolff
*Attorney, Agent, or Firm*—Burns, Doane, Swecker & Mathis

[57] ABSTRACT

Serially transporting diskettes from a stack to at least one disk drive for recording of a selected program thereon and then transporting the diskettes to at least one output stack. Included is input hopper for receiving diskettes onto which the selected program is to be recorded in a disk drive mounted in substantial vertical alignment with said input hopper. In addition, there is means for extracting one diskette at a time from the input hopper, and transporting the diskette from the extraction means, away from the input hopper, redirecting the last edge of the diskette to leave the hopper means vertically toward the mouth of the disk drive, insertion therein and removal therefrom, and finally transporting it to an output stack.

11 Claims, 12 Drawing Sheets

AUTOMATIC DISKETTE STACK LOADER

CROSS REFERENCE TO RELATED APPLICATION

This is a continuation of application Ser. No. 057,937 filed June 2, 1987, now abandoned.

BACKGROUND OF THE INVENTION

This invention relates to a mechanism for automatically inserting and removing diskettes into and from disk drives from a stack of blank diskettes, commonly known in the industry as an autoloader.

In the software industry, preexisting programs are generally provided to the customer on a diskette that is compatible with the type of disk drives generally used with the type of computer on which the software is designed to run. These diskettes may be 5¼ inch or 8 inch floppy diskettes, or the 3½ inch hard case diskettes.

To record the software programs on a diskette for sale, the blank diskette must first be formatted. The software is then recorded on the diskette and the recorded software is read back and verified with the master software from which it was recorded to determine if that which was recorded on the diskette agrees with what was intended to have been recorded thereon.

Figure 10:
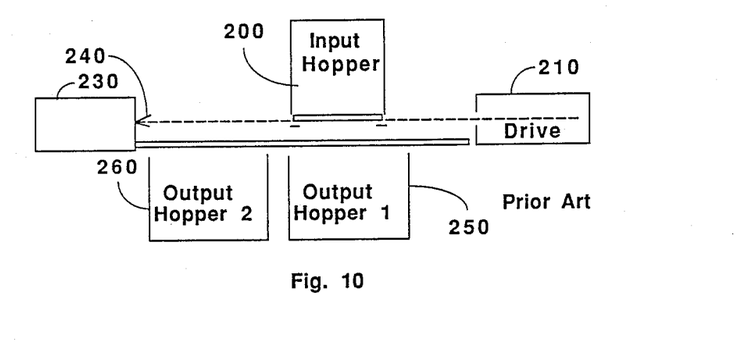
FIG. 10 is a schematic representation of an autoloader of the prior art.

This copy task can be done in a number of different ways. One could simply use a computer of the type for which the software was designed having one or more disk drives. With this system, the copies would be made by manually inserting and removing diskettes as the copies are made. This is very time consuming and expensive since it is a hands on operation. Another way to record the software for sale is to use an automatic diskette loader/unloader under computer control, commonly known as an autoloader. Of these there are several models currently on the market. For example, the Mountain Computer models 3235, 3250, and 3280, and Formaster models 3½ and 5¼. In each of these (See FIG. 10) there is a disk drive 210 mounted with its mouth opposite diskette 220 on the bottom of a stack of blank diskettes in an input hopper 200 with a carriage 230 that rides on a track 270 under the direction of a system control unit (typically a computer of the type that the software to be duplicated is to run on) to first pluck blank diskette 220 from the bottom of the stack in the input hopper 200 by means of jaws 240. Carriage 230 then delivers diskette 220 to drive 210 and inserts it thereinto and jaws 240 releases it. When the recording-/verification process is completed, diskette 220 is again grasped by jaws 240 and carriage 230 is directed by the system control unit to transport diskette 220 to a position directly over either output hopper 1 or 2 (250 or 260) depending on whether the software recording made thereon was verified or not. One output hopper will be designated by the system control unit to accept verified diskettes and the other output hopper will be designated to accept unverified, or reject, diskettes. When carriage 230 is in place above the proper output hopper, jaws 240 are opened and diskette 220 is dropped into the output hopper below. An autoloader of this design is necessarily very large, more than a single side dimension of a diskette in width and more than four times the side dimension of the diskette in depth.

What is needed is more efficient autoloader that can process diskettes more rapidly and more than one diskette at a time. Another advantage would be an autoloader that is more compact in size without being overly complex. The present invention provides an autoloader that achieves both results.

SUMMARY OF THE INVENTION

In accordance with the preferred embodiments of the present invention a method and apparatus is provided for serially transporting diskettes from a stack to at least one disk drive for recording of a selected program thereon and then transporting the diskettes to at least one output stack. Included is input hopper means for receiving at least one diskette onto which the selected program is to be recorded and mounting means in substantial vertical alignment with said input hopper means for receiving at least one disk drive for recording the selected program onto the transported diskettes. In addition, there is provided extraction means for extracting one diskette at a time from said input hopper means, and transport means for receiving the diskette from the extraction means, transporting it away from the input hopper, redirecting the last edge of the diskette to leave the hopper means vertically toward the mouth of the disk drive, insertion therein and removal therefrom, and transport to an output stack.

BRIEF DESCRIPTION OF THE FIGURES

FIG. 3a is a simplified drive belt diagram to drive the rollers of the present invention as shown in FIG. 1a.

DESCRIPTION OF THE PREFERRED EMBODIMENT

Figure 1A:
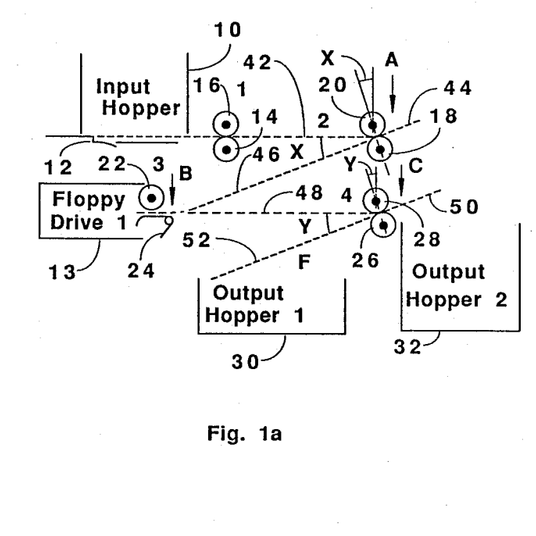
FIG. 1a is a schematic diagram of the present invention having a single floppy disk drive.

In FIG. 1a there is shown a schematic representation of several features of the present invention wherein a single floppy drive is included. This representation includes an input hopper 10 which is sized to hold a stack of floppy diskettes of the size onto which a selected software program is to be recorded on each. In hopper 10, the blank diskettes are each oriented right side up with the edge that is to be inserted into the disk drive to the left as shown in this figure. At the bottom left of the hopper 10 there is a pick assembly 12 which is selectively driven into, and retracted from, hopper 10 to advance a single diskette into the first pinch roller assembly 1.

The first pinch roller assembly includes a driven roller 14 and an idler 16. As roller 14 is driven in a clockwise direction, the diskette is advanced to the right with its right most edge being captured by the second pinch roller assembly 2 due to the inherent stiffness of the diskette and the pinch roller assemblies being adjacent each other less than the length of the side edge of the diskette from each other. Driven roller 18 and idler 20 make-up the second pinch roller assembly 2. Since driven roller 18 is also being driven in the clockwise direction, and the diskette is somewhat flexible, the diskette continues to advance through path 42 into path 44.

As can be seen in FIG. 1a, roller 18 and idler 20 are mounted so that a line drawn through the center of each of their horizontal axis is at an angle X to a line normal to the horizontal path 42. As the diskette is advanced to the right, the left most edge of the diskette will eventually travel to the right beyond the first pinch roller assembly 1. When this occurs, the left most edge of the diskette will drop downward through an angle X with the diskette assuming a position that is partially in paths 44 and 46. This occurs for two reasons: the inherent stiffness of the diskette, and the above-described orientation of roller 18 with respect to idler 20. In this orientation the surface of the diskette is now normal to the line that connects the horizontal axes of roller 18 and idler 20.

The diskette continues to be advanced to the right until its right most edge is detected by a mechanical or optical sensor at A. Position A is selected to be sufficiently to the right of pinch roller assembly 2 to permit the left most edge of the diskette to be released from the first pinch roller assembly 1. The sensor at position A, when the diskette is detected signals the motor control to reverse the direction of roller 18. When this occurs, the diskette is then advanced along path 46 toward third pinch roller assembly 3. Third pinch roller assembly 3 includes driven roller 22, which is driven in the opposite direction as roller 18 since it is on top as opposed to the bottom as is roller 18, and a first "L" idler 24. "L" idler 24 is rotationally mounted on a central shaft so that its upper leg can be maintained in either a juxtaposed or spaced-apart position with or from, respectively, roller 22. When the diskette is being advanced through paths 46–48, the upper leg of the "L" idler is maintained in the juxtaposed position with roller 22.

Angle X is selected so that the left most edge of the diskette is directed toward the third pinch roller assembly 3 to allow the third pinch roller assembly to cause the diskette to be inserted into floppy drive 13. So that the diskette is not dropped as it is advanced between the second and third pinch roller assemblies, these assemblies are spaced-apart from each other by less than the length of a side edge of the diskette. As the diskette is advanced to the left, the diskette is again bent by roller 22 and "L" idler 24 so that the portion of the diskette that has advanced through them is again horizontal and progressing into drive 13. Horizontal orientation is again achieved by the placement of roller 22 directly above the horizontal top leg of "L" idler 24. As the diskette progresses to the left, its right most edge will come free of the second roller assembly with the diskette now assuming path 48 as it continues to progress to the left. Roller 22 is continuously rotated in the clockwise direction to fully insert the diskette into drive 13. At this time, "L" idler 24 is rotated counter-clockwise so that its upper leg is spaced-apart from roller 22. Note, at this point in the cycle roller 22 can either be stopped or continue to rotate.

To signal the control apparatus that the diskette is fully inserted into drive 13, a mechanical or optical sensor is placed at position B. Once in drive 13, the recording process is begun with the diskette being formatted, as required, then the desired program is recorded thereon, and finally the recorded program is verified against the master program from which the recording was produced. When the verification procedure is completed, "L" idler 24 is rotated to bring its upper leg into juxtaposed position with roller 22 to pinch the right most edge of the diskette with roller 22 being turned in the counter-clockwise direction to withdraw the diskette from drive 13. The rotation of roller 22 advances the diskette along path 48 toward fourth pinch roller assembly 4. As with each of the other pinch roller assemblies in the described sequence, the fourth pinch roller assembly 4 is spaced-apart from the third pinch roller assembly 3 less than the length of the side edge of the diskette. Fourth pinch roller assembly 4 includes a driven roller 26 and an idler 28 with roller 26 being rotated in the clockwise direction as the diskette is advanced along path 48 toward it. Roller 26 and idler 28, similarly to roller 18 and idler 20, are offset at an angle Y to a normal to horizontal. As the diskette is advanced to the right, the right most edge of the diskette will be detected by a mechanical or optical sensor at point C with that information being provided to the system control unit. As a result of the recording process, the system control unit can use the sensor at C to sort the diskette into one of the two output hoppers 30 and 32. For example, output hopper 30 might be used for the diskettes which were recorded properly and verified, whereas output hopper 32 may be used for those diskettes that can not be verified.

If the diskette is to be placed into output hopper 30, roller 26 is rotated in the clockwise direction until the sensor at C detects the right most edge of the diskette signaling that the left most edge of the diskette has cleared the third pinch roller assembly 3 and is now partially in paths 50 and 52. Roller 26 is then rotated in the counter-clockwise direction with the diskette angled downward through the angle Y until the diskette drops into output hopper 30. Roller 26 is continuously advanced in the same direction until both edges of the diskette are detected by another sensor at F, at which time the process would be restarted to process another diskette. Alternatively, the sensor at F would not be necessary if the system control unit where programed to continue the rotation of roller 26 for a selected length of time that is sufficient for the diskette to be delivered to hopper 30.

If the system control unit decides to deposit the diskette into output hopper 32, then roller 26 is continually rotated in the clockwise direction until the sensor at C detects both the right and left most edges of the diskette. When the left most edge of the diskette clears the sensor at C, the diskette will simply fall into output hopper 32 at which time the process will be restarted to process another diskette.

If the system is to process one diskette at a time, then all of the drive rollers can be driven simultaneously in alternating directions as described above. For example, as the diskette moves to the right, rollers 14, 18 and 26 are rotated clockwise and roller 22 is rotated counter-clockwise. Similarly, as the diskette moves to the left, rollers 14, 18 and 26 are rotated counter-clockwise and roller 22 is rotated clockwise. Also, pick 12 and "L" idler 24 can be mechanically linked so that as pick 12 moves to the left, "L" idler 24 can be rotated counter-clockwise by that motion after the diskette has been captured by the fourth pinch roller assembly 4.

If the system of FIG. 1a is to be used to process two diskettes at the same time, then a modification of the operation as discussed above is necessary. One approach would be to locate the fourth pinch roller assembly 4 closer to the third pinch roller assembly 3 than the second pinch roller assembly 2 is located to the first pinch roller assembly 1. By doing so, a diskette in the upper paths 42-46 would remain captured between roller 18 and idler 20 long enough for the diskette in lower paths 48 and 50 to fall into output hopper 32 if it were to be deposited there. In order for that to work, the control system would have to detect the presence of the upper diskette by the sensor at A between the detection of the right and left edges of the lower diskette by the sensor at C, i.e. the control system would not act to reverse the direction of rotation of the rollers upon a signal from the sensor at A when the lower diskette is to be deposited into output hopper 32, however, the control system would do so if the lower diskette is to be deposited into output hopper 30.

Another approach would be to operate pick 12 and "L" idler 24 independently of each other with the spacing between the pinch rollers being unchanged. If the lower diskette is to be deposited into output hopper 30, the pick 12 and "L" idler 24 would be activated to present the right most edge of another diskette from input hopper 10 to the first pinch roller assembly 1 at approximately the same time as "L" idler 24 is rotated clockwise to close on the diskette in drive 13 to extract it therefrom with the operation proceeding as discussed above for similar operation in the single diskette case. When the lower diskette is to be deposited into output hopper 32, "L" idler 24 must be activated first to advance the lower diskette from drive 13 into path 48 before another diskette is presented to roller 14 and idler 16 from input hopper 12 so that the upper diskette will not advance completely through second pinch roller assembly 2 as the lower diskette is advanced completely through the fourth pinch roller assembly 4. The lower diskette must be advanced into path 48 by at least a distance equivalent to the distance between second pinch roller assembly 2 and the sensor at A plus a selected tolerance.

Yet another approach could be a combination of the two approaches.

Figure 1B:
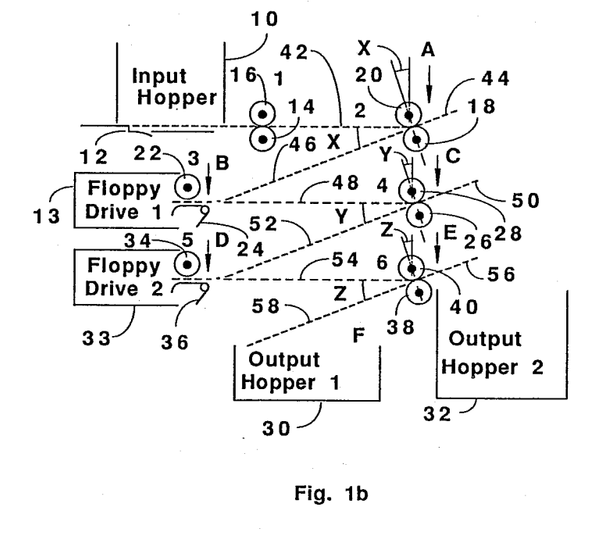
FIG. 1b is a schematic diagram of the present invention having two floppy disk drives.

FIG. 1b shows, schematically, an extension of the invention depicted in FIG. 1a to a system having two floppy drives, 13 and 33. With the introduction of the second drive, the step of verification can be performed on a previously recorded diskette in the second drive at the same time as the program is being recorded on another diskette in the first drive. In other words, the program is first recorded on a diskette in drive 13 then the diskette is advanced to drive 33 were the recorded program is verified against the master program at the same time that the program is being recorded on another diskette that has been advanced into drive 13 from input hopper 12. This saves time since the verification step requires that the program be played a second time into a comparator after the recording has been done. Thus, by using two drives, the program as it is being played can be directed to drive 13 for recording on the diskette therein at the same time that it and the recorded program from the second drive are being played into a comparator to verify the recorded program on the diskette in the second drive. Similarly, if it would be advantageous to perform more that two functions simultaneously (i.e. formatting, recording and verification) the design could be expanded to include additional drives and supporting pinch roller assemblies.

FIG. 1b is the same as FIG. 1a except for the addition of floppy drive 33, sensors at D and E, and fifth and sixth pinch roller assemblies 5 and 6, thus creating additional paths 54-58. Fifth pinch roller assembly 5 includes fifth driven roller 34 and second "L" idler 36. Sixth pinch roller assembly 6 includes sixth driven roller 38 and idler 40 with them offset from each other by an angle Z as shown. Since this configuration is for multiple diskette operation, then only "L" idler 36 must be operated independently from pick 12, or sixth pinch roller assembly 6 must be closer to fifth pinch roller assembly 5, or a combination of the two as discussed for the output stage in FIG. 1a.

The configuration of FIG. 1b is offered specifically for handling of multiple diskettes during the process. For FIG. 1b there will be up to three diskettes in the system at any one time. The operation of the system after at least two diskettes have already been accepted from input hopper 12 is as follows. Rollers 14, 18, 26 and 38 are all rotating clockwise, and rollers 22 and 34 are rotating counter-clockwise. Pick 12 is advanced to the right to load the next diskette from input hopper 10 and "L" idlers 24 and 36 are rotated clockwise to extract the diskettes from drives 13 and 33. The first diskette progresses through path 42 into path 44 and then into path 46, while the second diskette progresses through path 48 into path 50 and then into path 52, while the third diskette progresses through path 54 into path 56. Once the second and third diskettes have cleared the sensors at points B and D, respectively, "L" idlers 24 and 36 may be rotated counter-clockwise to space them apart from rollers 22 and 34 respectively. Pick 12 is advanced to the left starting anytime after the right most edge of the next diskette is captured be the first pinch roller assembly 1, however, in the configuration shown in this figure pick 12 will begin its leftward advance when the right most edge of the first diskette is detected by the sensor at A since there is no earlier sensor shown.

In any desired embodiment, rollers 14, 18 22, 26, 34 and 38, and idlers 16, 20, 28 and 40 can be the full width of the diskette being driven, be segmented, or be two short sections disposed to address the diskettes along their edges. This can be true of either the rollers or the idlers, or both, so long as the idler segments are opposed by a portion of a roller. What ever the configuration, it must be such that the diskette does not turn horizontally as it is being advanced through the paths of the apparatus. Since the diskette being advanced can be either a flexible floppy, as in the case of the 5¼" and 8" diskettes, or a hard case floppy, as in the case of the 3½" diskettes, the composition of the rollers and idlers must be varied accordingly. For the flexible diskettes, the rollers and idlers, other than the "L" idlers, may be of a hard yet somewhat compressible rubber since the flexibility of the diskette allows them to make the necessary bends as they pass into pinch roller assemblies 2, 4 and 6. The hard case diskettes, on the other hand, do not have this flexibility, thus the rollers and idlers, other than the "L" idlers, can be of a larger diameter and be made of compressible foam rubber or plastic. When the hard case diskette is advanced, for example into pinch roller assembly 2, the right most end of the diskette is forced upward, compressing idler 20, until the left most edge of the diskette clears first pinch roller assembly 1 with the diskette then assuming path 46. It should be noted that for a hard case diskette the paths through the apparatus will be slightly different from those shown in FIGS. 1a and b. For example, path 42 will be substantially horizontal as shown until the right most edge of the diskette is captured by second pinch roller assembly 2 at which time path 42 will slope slightly downward to the left. When the diskette clears first pinch roller 1 it assumes path 46, as shown, until its left most edge is captured by third pinch roller assembly 3 at which time the left edge compresses roller 22 and the right most edge compresses roller 18 slightly decreasing the slope of the path 46 from that shown in FIG. 1b.

Referring next to FIGS. 2a and b there is again shown the schematic representations of FIGS. 1a and b together with several other details. Since some of the floppy diskettes which may be processed by a system such as that of the present invention, several guide vanes might be required to insure that the diskettes are directed substantially toward the next pinch roller assembly in its designated path. Vanes 66-72 are shown to provide that direction. In a specific design for a specific type of diskette, none, some, or all of these, or similar vanes may be necessary. The lower leg of "L" idlers 24 and 36 also serve the function of a guide vane.

Figure 2A:
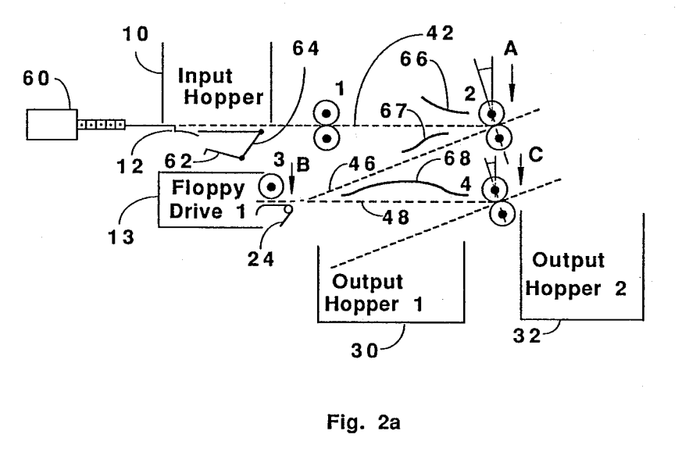
FIG. 2a is the schematic diagram of FIG. 1a enhanced to show additional features of the present invention.
Figure 2B:
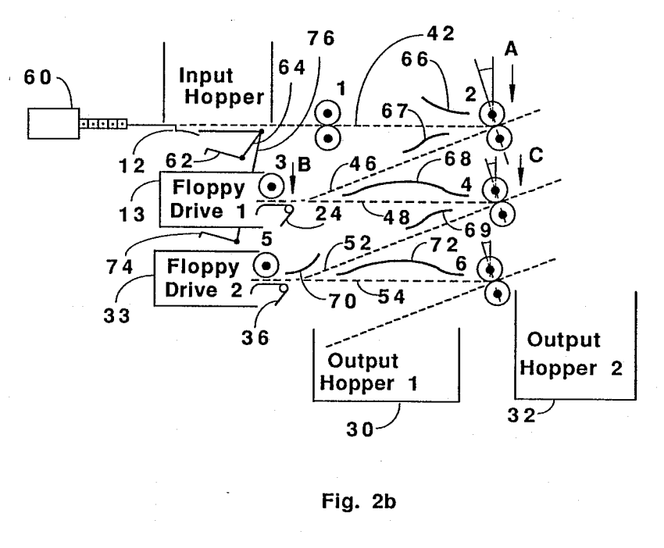
FIG. 2b is the schematic diagram of FIG. 1b enhanced to show additional features of the present invention.

Also shown in FIGS. 2a and 2b is a motor 60 for advancing an retracting pick 12, and, coupled to the mechanism of pick 12, are linkages 64 and 76 and drive head depression fingers 62 and 74. When pick 12 is advancing a diskette into path 42, another diskette is being removed from each of the disk drives 13 and 33, thus fingers 62 and 74 must be in the up position so that the internal spring within each disk drive can unclamp the spindle and allow the magnetic head to rise from the diskette. Similarly, as pick 12 is being retracted, a diskette is being advanced into the disk drives. When pick 12 is fully retracted each disk drive will have a diskette in place ready to be read from or written to, thus linkages 64 and 76 are exercised to lower fingers 62 and 74 to clamp the spindle and lower the magnetic heads within each of the drives.

Figure 8A:
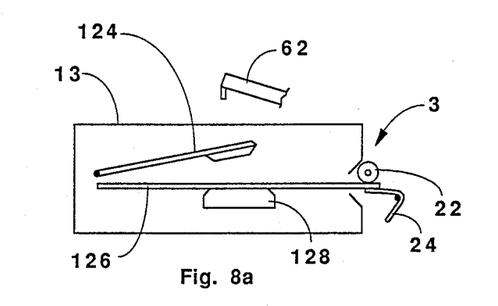
FIGS. 8a and 8b show simplified side cut-away views of a disk drive showing the operation of the powered roller and "L" idler of the present invention.
Figure 8B:
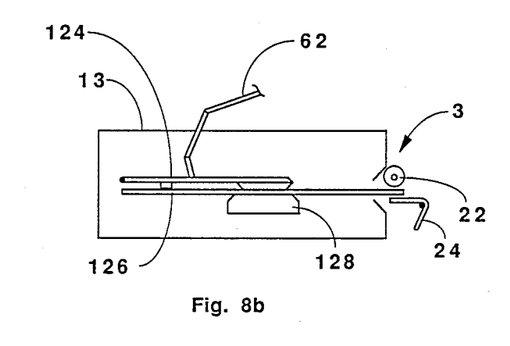

In FIGS. 8a and b a simplified cross-section of a floppy disk drive 13 is shown. Included is a spindle 128 for spinning the magnetic media within the jacket of floppy diskette 126 when arm 124 is lowered. Arm 124 carries a spindle clamp which mates with spindle 128 through the central hole in the magnetic media of diskette 126, and the read/write head of the drive which is disposed adjacent the read/write window of the diskette when the arm is lowered. Arm 124 is spring loaded within drive 13 and biased toward the open position. To lower arm 124, the present invention includes a finger 62 that is extendable through the top of drive 13 to do so. In the simplified diagrams of FIGS. 8a and b the drive is shown as being a single sided drive (i.e. there is only a read/write head adjacent one side of the diskette). In a two sided drive (i.e. a read/write head on each side adjacent the diskette) the read/write head adjacent the bottom side of the diskette is mechanically linked to arm 124, is normally spring biased open, and also closes on the diskette when arm 124 is depressed. Also shown in FIGS. 8a and b is the operation of "L" idler 24. In FIG. 8a arm 124 is in the up or open position allowing the diskette 126 to be inserted or removed. To accomplish that "L" idler 24 is shown in its clockwise rotated position to pinch the right most edge of diskette 126 between its upper leg and driven roller 22. In FIG. 8b "L" idler is shown in its retracted or counter-clockwise position to release the edge of diskette 126 from contact with either roller 22 or "L" idler 24 so that the inner magnetic media being rotated by the drive mechanism is not impeded and, if roller 22 continues to rotate, the diskette is not unnecessarily stressed by trying to remove it or to insert it farther during the read/write operation.

Figure 3A:
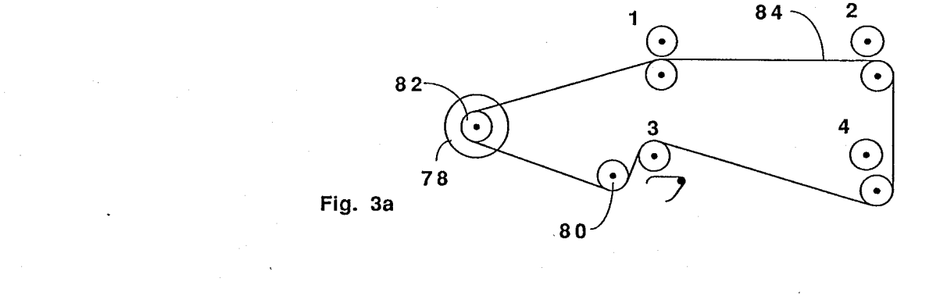
Figure 3B:
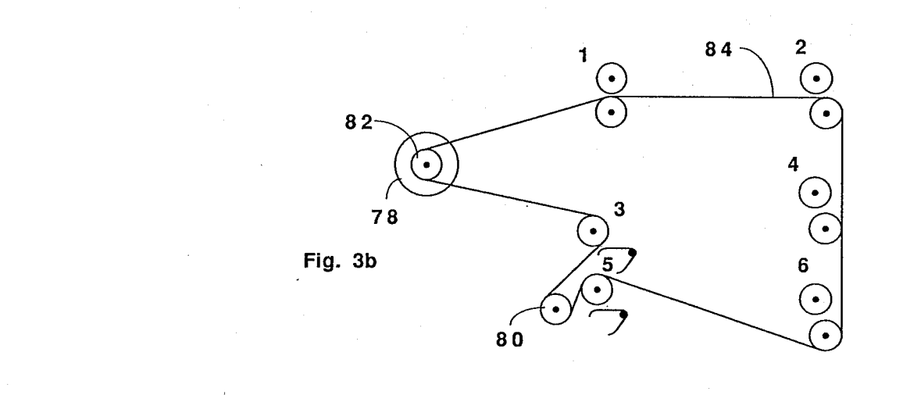
FIG. 3b is a simplified drive belt diagram to drive the rollers of the present invention as shown in FIG. 1b.

Next, FIGS. 3a and b each show a motor and belt drive arrangement for rotating the rollers of the systems of FIGS. 1a and b, respectively. In each of FIGS. 3a and b there is shown a motor 78 having a pulley 82 on its output shaft which is connected to each of the driven rollers of each of the pinch roller assemblies 1-6 by means of a flexible belt 84. In addition a belt idler pulley 80 is included. Note that all rollers are driven together with the driven rollers on top in their respective pinch roller assemblies being driven in the same direction as each other, and the driven rollers on the bottom in their respective pinch roller assemblies being driven in the same direction as each other but in the opposite direction as those rollers on the top in their assemblies.

Figure 4:
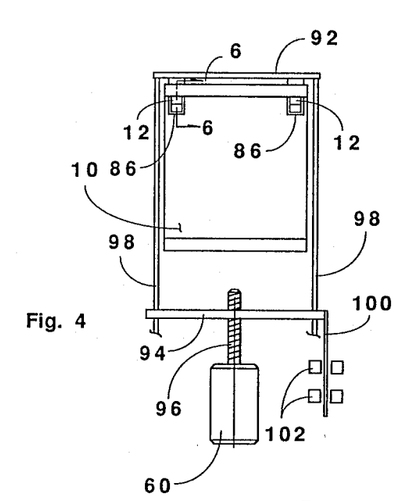
FIG. 4 is a partial top view showing the input hopper portion of the present invention.

FIG. 4 is a partial assembly drawing of the present invention showing a top view of input hopper 10 and pick 12. For orientation purposes, the top of this figure corresponds to the left side of FIGS. 1a and b. In each of the top corners of the bottom of input hopper 10 are rectangular windows 86 through which picks 12 extend into the bottom thereof. Picks 12 are each affixed to bar 92 outside and behind hopper 10, and bar 92 is mounted on the ends of two rods 98 which extend horizontally along either side outside of hopper 10 and are affixed to a second bar 94 in front of hopper 10. Each of rods 98 extend through bar 94 as will be discussed in relation to FIGS. 7a-d below. Bar 94 includes a tapped hole through which the threaded drive shaft 96 of motor 60 extends. Thus, as motor 60 is rotated in one direction picks 12 are drawn into windows 86, and when motor 60 is rotated in the opposite direction picks 12 are extracted from windows 86. Also affixed to one end of bar 94 is a flag 100 which is shown passing through two optical sensors 102. These are provided to indicate the location of the picks 12 to the control system, as will be discussed below with relation to FIG. 5.

Figures 6A, 6B:
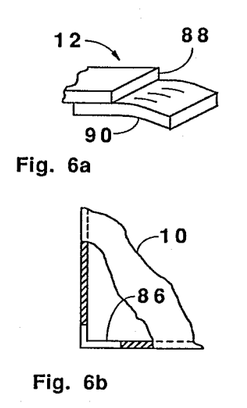
FIG. 6a is a partial perspective view of one of the diskette picks of the stack loader of FIG. 5.
FIG. 6b is a partial cut-away plan view of the stack loader hopper taken along line 6—6 of FIG. 4 with the diskette pick omitted from this view.
Figure 6C:
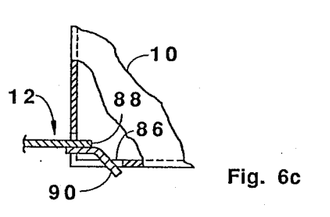
FIG. 6c is a partial cut-away plan view of the stack loader hopper taken along line 6—6 of FIG. 4 with the diskette pick fully extended into the stack loader hopper.
Figure 6D:
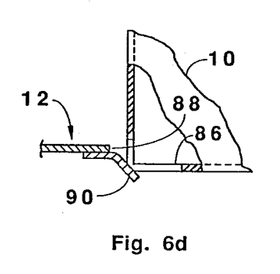
FIG. 6d is a partial cut-away plan view of the stack loader hopper taken along line 6—6 of FIG. 4 with the diskette pick fully extracted from the stack loader hopper.

FIG. 6a is a perspective view of a single pick 12, and FIGS. 6b–d are cross-sectional views taken along line 6—6 in FIG. 4. Pick 12 is FIG. 6a includes a shoulder 88 and a tongue 90 below and extending forward of shoulder 88.

FIG. 6b is a side view showing window 86 in hopper 10 without pick 12 in place. Note that window 86 is partially in the bottom and the back side of hopper 10. FIG. 6c shows pick 12 fully extended into window 86 wherein it can be seen that the surface of tongue 90 extends through window 86 into hopper 10 above the bottom surface of hopper 10. In addition, shoulder 88 is shown extending into hopper 10 forward of its rear side. The position shown here occurs when bar 94 is pulled to its forward limit by motor 60. In FIG. 6d pick 12 is shown fully extracted from window 86 wherein no portion of pick 12 extends into the interior of hopper 10. This position of pick 12 occurs when bar 94 is pushed to its rear most limit by motor 60. In operation, as picks 12 are extended into hopper 10, the top surface of tongue 90 first comes into contact with the bottom most diskette in hopper 10. Since tongue 90 is bent in the form of a ramp, tongue 90 lifts the rear edge of the stack of diskettes in hopper 10. As picks 12 advance forward, shoulder 88, which is no higher than a single diskette is thick, comes into contact with the rear most edge (referred to as the left most edge in the discussions with respect to FIGS. 1a and b) of the bottom diskette and pushes it forward as picks 12 are advanced forward. As picks 12 are extracted from windows 86, the rear most edge of the stack of diskettes in hopper 10 is lowered as the rear most edge of the new bottom diskette slides down the forward ramp of tongue 90 until it comes to rest again on the bottom of hopper 10.

Figure 5:
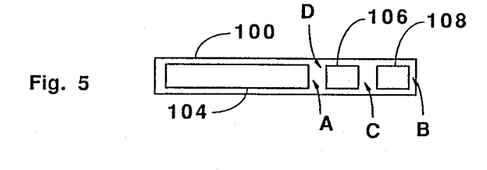
FIG. 5 is a plan view of the stack loader pick location flag of the present invention.

FIG. 5 shows pick positional flag 100 with its three windows 104–108 therein. Window 104 is a long rectangular window, whereas windows 106 and 108 are each one-quarter to one-third as long as window 104. With flag 100, mounted to bar 94 and extending horizontally forward therefrom, window 104 is closest to bar 94. Windows 104–108 in combination with the pair of optical sensors 102 provide information to the system control unit as to the position of picks 12 when they are fully inserted or extracted from input hopper 10, and when shoulder 88 just comes into contact with the bottom diskette in the stack. When the picks 12 are fully extracted from hopper 10 both of sensors 102 are blocked, the rear most sensor will be opposite point A on flag 100 and the forward most sensor 102 will be opposite point B on flag 100. That position is also referred to as the calibrate position and the spindle in the floppy drive(s) is clamped. At no other time will the rear most sensor 102 be blocked, it will at all other times be viewing through window 104. When picks 12 are in the ready to pick position, shoulder 88 in contact with the bottom diskette in the stack, the forward most sensor 102 will be blocked by the portion of flag 100 labeled C. Finally, when picks 12 are in their forward most position, the forward most sensor 102 will be blocked by the portion of flag 100 labeled D. Thus, the system control unit must detect two blockages of the forward most sensor 102 as the picks 12 are driven forward before the direction of the picks 12 is reversed.

Figure 7A:
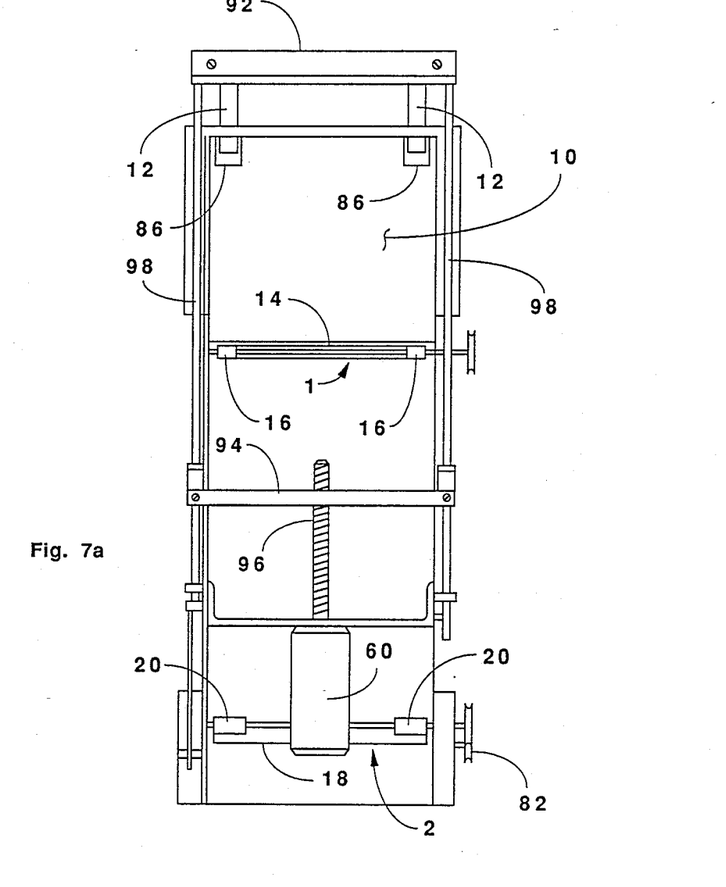
FIG. 7a is a top plan view of a diskette stack loader of the present invention.

FIGS. 7a–d show the top, bottom, left side and right side, respectively, of a prototype of the present invention. In FIG. 7a, the top view, there can be seen input hopper 10 with picks 12 extending partially thereinto through windows 86. Picks 12 are affixed to bar 92, which is affixed to rods 98 outside and on either side of hopper 10. Rods 98 in turn are affixed to and extend through bar 94, with bar 94 having a tapped hole therethrough to receive threaded shaft 96 of motor 60. Also shown are first and second pinch roller assemblies 1 and 2, with idlers 16 and 20 being short segments opposite each end of its corresponding driven roller, and pulley wheel 82 on the shaft of motor 78 (not shown).

Figure 7B:
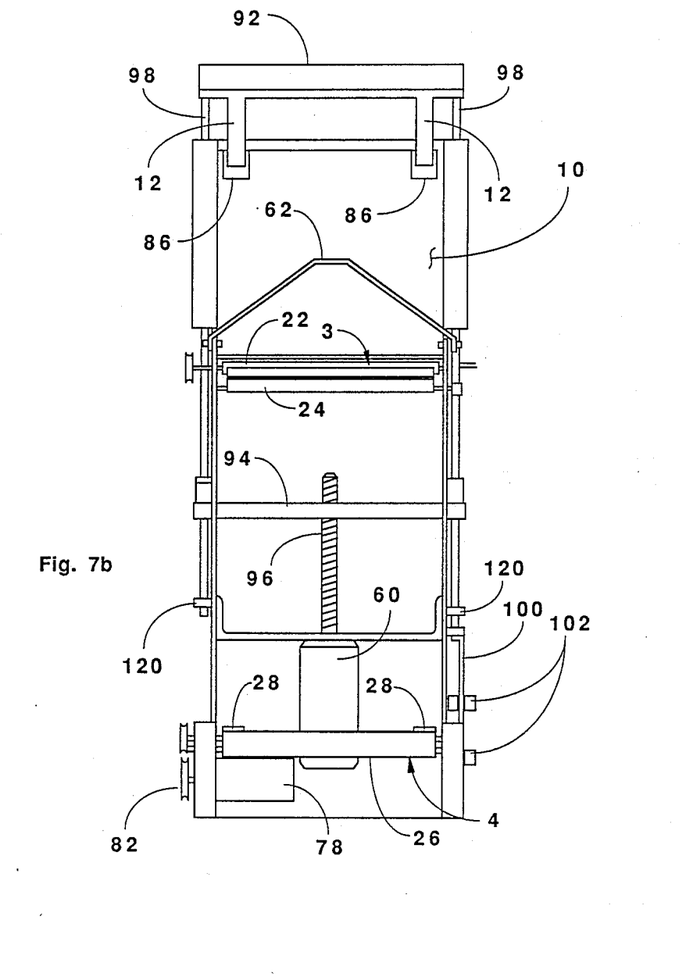
FIG. 7b is a bottom plan view of a diskette stack loader of the present invention.

Referring next to FIG. 7b, the bottom view, there is shown the bottom of input hopper 10 with its windows 86 into which picks 12 extend partially. Picks 12 are also shown here affixed to bar 92, in turn to rods 98, and then rods 98 are affixed to bar 94 with their ends extending therethrough and slidably journaled within bearings 120. Affixed to the end of rod 98 on the left side (top of figure) of the apparatus is flag 100 which extends between the two portions of each of sensors 102 which are affixed to the main frame of the apparatus. Bar 94 can also be seen coupled to the threaded shaft 96 of motor 60. The other visible items are motor 78 with its pulley 82, third and fourth pinch roller assemblies 3 and 4 with their corresponding idlers 24 and 28 with idler 28 shown as a pair of segments opposite the ends of roller 26, and depression finger 62 which would not be visible if floppy drive 13 where in place.

Figure 7C:
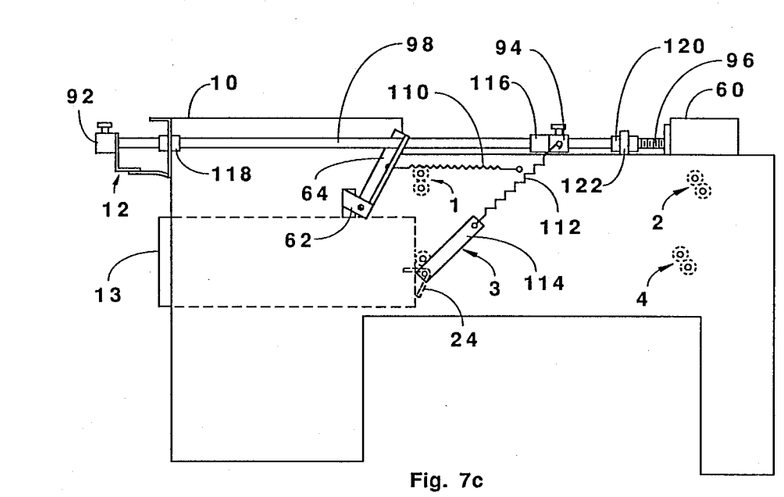
FIG. 7c is a front side plan view of a diskette stack loader of the present invention.

FIG. 7c, the left side view, again shows input hopper 10 with picks 12 extending partially thereinto from the rear (left side of figure). To the rear of picks 12 there is bar 92 to which they are affixed which in turn is affixed to rods 98. Rods 98 are supported on the apparatus frame by bushings 118 and 120 through which the rods pass near their rear and front ends. Near the front end of rods 98 they are affixed to bar 94. This view also shows motor 60 with its threaded shaft 96, and in dotted outline the placement of floppy drive 13 and pinch roller assemblies 1–4. Coupled rigidly to the shaft of "L" idler 24 is arm 114 which in turn is coupled to bar 94 by means of spring 112 to provide motion to "L" idler 24 in conjunction with the movement of picks 12 as described above. Finally, there is shown a portion of depression finger 62 which extends out from the frame of the apparatus and is rigidly affixed to arm 64. Arm 64 has a hole through a flange thereon through which rod 98 on the left side passes. Arm 64 is normally biased toward the front (to the right in this figure) of the apparatus by spring 110, thus holding depression finger 62 in the up position. As motor 60 drives bar 94 toward the rear, thus extracting picks 12 from hopper 10, rubber washer 116 on the left side of rod 98 eventually comes into contact with the flange on arm 64 causing it to move rearward and, in so doing, lower depression finger 62 onto arm 124 (see FIGS. 8a and b) of floppy drive 13 below.

Figure 7D:
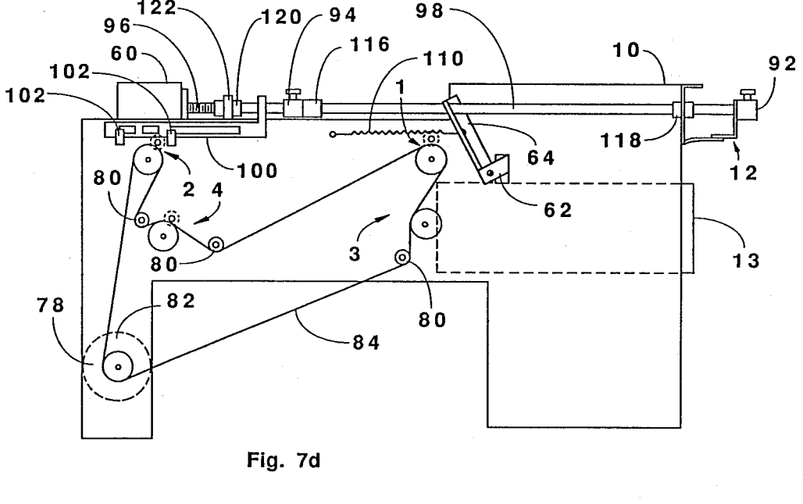
FIG. 7d is a back side plan view of a diskette stack loader of the present invention.

FIG. 7d, the right side view, again shows input hopper 10 with picks 12 extending partially thereinto from the rear (right side of figure). To the rear of picks 12 there is bar 92 to which they are affixed which in turn is affixed to rods 98. Rods 98 are supported on the apparatus frame by bushings 118 and 120 through which the rods pass near their rear and front ends. This view also shows motor 60 with its threaded shaft 96, and in dotted outline the placement of floppy drive 13. Additionally, there is shown a portion of depression finger 62 which extends out from the frame of the apparatus and is ridgidly affixed to arm 64. Arm 64 has a hole through a flange thereon through which rod 98 on the right side passes. Arm 64 is normally biased toward the front (to the left in this figure) of the apparatus by spring 110, thus holding depression finger 62 in the up position. As motor 60 drives bar 94 toward the rear, thus extracting picks 12 from hopper 10, rubber washer 116 on the right of side rod 98 eventually comes into contact with the flange on arm 64 causing it to move rearward and in so doing lower depression finger 62 onto arm 124 (see FIGS. 8a and b) of floppy drive 13 below. In addition, this figure shows flag 100 affixed to the forward end of the right side rod 98 with flag 100 extending further to the front of the apparatus between the two halves of each of sensors 102 mounted on the frame of the apparatus. Finally, the ends of each of the driven rollers in each of pinch roller assemblies 1–4 are shown with a pulley on each of them, motor 78 in dotted outline with its pulley 82 on the shaft thereof, a flexible belt 84 interconnecting each of those pulleys as shown with three belt idlers 80 to cause belt 84 to wrap sufficiently around each of the pulleys.

Figure 9:
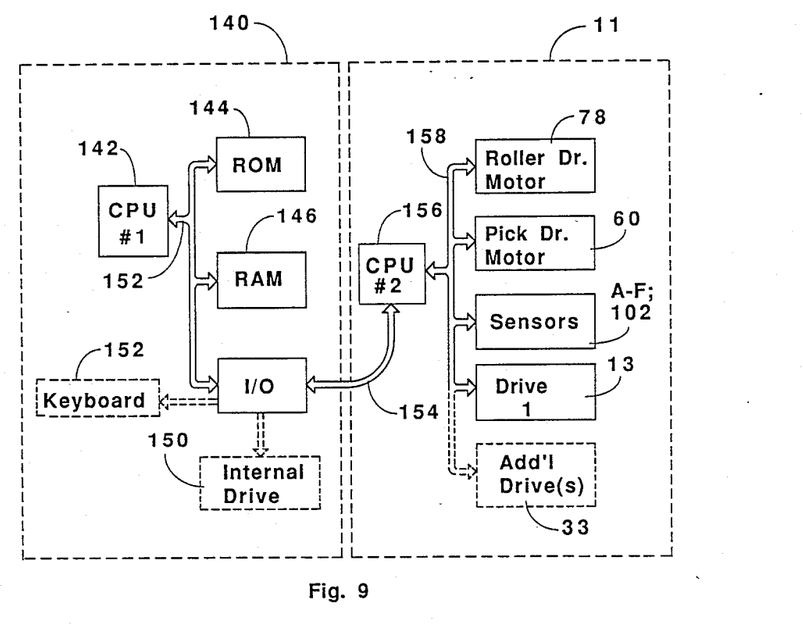
FIG. 9 is a block diagram of the system control unit and present invention interface.

Represented by FIG. 9 is the system control unit 140 interfacing with CPU 156 within the autoloader apparatus of the present device via an RS-232 bus 154. CPU 156 in turn interfaces with the electro-mechanical elements of the autoloader 11 of the present invention. System control unit 140 includes a CPU 142 which interfaces via data bus 152 with a ROM 144, RAM 146 and an Input/Output device 148. Also optionally includable with the system control unit 140, interfacing with I/O 148 are a key board 152 and an internal drive 150. I/O 148 also interfaces via RS-232 bus 154 with CPU 156, which in turn via bus 158 interfaces with roller drive motor 78, pick drive motor 60, sensors A–F and 102, floppy drives 13 and any additional drives 33 which may be included. System control unit 140 can be either a microprocessor based control unit internal to the autoloader of the present invention, or it could be a stand-alone computer. The program to be recorded on each diskette by the autoloader of the present invention could be resident in ROM 144 or on a diskette that is loaded in optical drive 150.

While the invention has been illustrated and described in its preferred embodiments, it should be understood that the invention is not limited to the precise details illustrated herein and described above since the same may be carried out in other ways falling within the scope of the invention as illustrated and described. For example, in the illustrated embodiments the floppy drives have been shown to be below the input hopper with the diskettes being fed down to them. It should be clear to one skilled in the art that the diskettes could just as easily be fed upward to floppy drives located above the input hopper with the output hoppers relocated above as well, to the side, below, or any combination of those locations. The scope of the present invention is only limited by the scope of the following claims.

What is claimed is:

1. Apparatus for serially transporting diskettes from a horizontally oriented stack to at least one disk drive for recording of a selected program on said diskettes and then transporting said diskettes to at least one output stack, said apparatus comprises:

input hopper means for receiving at least one diskette in a horizontally oriented stack onto which the selected program is to be recorded;

mounting means beneath and in substantial vertical alignment with said input hopper means for receiving at least one disk drive in a horizontal orientation, one below the other, for recording the selected program onto the transported diskettes;

extraction means for extracting one diskette at a time from said input hopper means; and transport means for receiving the diskette from the extraction means, transporting it away from the input hopper means substantially horizontally, redirecting the diskette downward toward the first of said at least one disk drive, inserting and removing the diskette into and from the disk drive substantially horizontally, and transporting the diskette downward to an output stack.

2. Apparatus as in claim 1 wherein:

said input hopper means defines at least one hole thereinto through the bottom and the lower portion of the side opposite the side from which each diskette is extracted and received by the transport means; and said extraction means includes pick means positioned beneath the input hopper means to selectively extend into said at least one hole therein to push the bottom diskette from the stack of diskettes within the input hopper means toward the transport means.

3. Apparatus as in claim 2 wherein said pick means includes:

tongue means in the form of a ramp for lifting the rearmost edge of the diskettes in the stack in the input hopper means as the pick means is extended into the input hopper means through said hole; and shoulder means affixed to the tongue means along the last portion thereof to be extended into the hole through the input hopper means for contacting the edge of the bottom most diskette pushing it toward the transport means.

4. Apparatus as in claim 1 wherein said transport means includes a plurality of combinations of roller and idler means; one of said plurality of combinations of roller and idler means adjacent said input hopper means for receiving diskettes from the input hopper means; on each of a first multiplicity of said plurality of combinations of roller and idler means adjacent each location of said at least one disk drive in said mounting means; and one each of a second multiplicity of said plurality of combinations of roller and idler means aligned horizontally with, and spaced-apart less than an edge length of a diskette from, each combination of roller and idler means of said one, and each of said first multiplicity of, said plurality of combinations of roller and idler means.

5. Apparatus as in claim 5 wherein each of said plurality of combinations of roller and idler means includes a driven roller and an idler, and each of said second multiplicity of said plurality of combinations of roller and idler means are mounted such that a vector that is perpendicular to the longitudinal, horizontal axis of both of the driven roller and idler is at a selected angle to vertical to direct a diskette received from a combination of roller and idler means aligned horizontally therewith to a different horizontal plane.

6. A method for serially transporting diskettes from a horizontally oriented stack to at least one disk drive for recording of a selected program on said diskettes and then transporting said diskettes to at least one output stack, the steps of said method comprises:

a. receiving in an input hopper at least one diskette in a horizontally oriented stack onto which the selected program is to recorded;

b. mounting beneath and in substantial vertical alignment with said input hopper at least one disk drive in a horizontal orientation, one below the other, for recording the selected program onto the transported diskettes;
c. extracting one diskette from said input hopper means;
d. receiving the diskette of step c.;
e. transporting the diskette received in step d. substantially horizontally away from the input hopper;
f. redirecting the diskette downward toward a first of said at least one disk drive;
g. inserting the diskette as identified in step f. into the first of said at least one disk drive;
h. removing the diskette from the first of said at least one disk drive after the recording process is completed;
i. transporting substantially horizontally the removed diskette of step h. away from the first of said at least one disk drive;
j. sorting the removed diskette from step i. into an output stack;
k. repeating steps f. thorugh j, sequentially for as many additional disk drives as are included beneath the first of said at least one disk drive, if any; and
l. repeating steps c. through k. sequentially for as many diskettes as desired or loaded in the input hopper in step a.

7. A method as in claim 6 wherein step c. includes the steps of:
m. lifting one edge of said at least one diskette of step a.; and
n. pushing the bottom most diskette of said at least one diskette of step a. from the input hopper.

8. Apparatus for serially transporting diskettes from a horizontally oriented stack to at least one disk drive for recording of a selected program on said diskettes and then transporting said diskettes to at least one output stack, said apparatus comprising:
input hopper means in a first horizontal plane for receiving at least one diskette in a horizontally oriented stack onto which the selected program is to be recorded;
mounting means for receiving at least one disk drive each in a different horizontal plane that is lower than said first horizontal plane, said at least one disk drive for recording the selected program onto the transported diskettes;
extraction means for extracting one diskette at a time from said input hopper means; and
transport means for receiving the diskette from the extraction means, transporting it away from the input hopper means, redirecting the diskette downward toward the first of said at least one disk drive, inserting and removing the diskette into and from the disk drive substantially horizontally, and transporting the diskette downward to an output stack;
wherein said transport means includes:
a plurality of combinations of roller and idler means;
one of said plurality of combinations of roller and idler means adjacent said input hopper means for receiving diskettes from the input hopper means;
one each of a first multiplicity of said plurality of combinations of roller and idler means adjacent each location of said at least one disk drive in said mounting means; and
one each of a second multiplicity of said plurality of combinations of roller and idler means aligned horizontally with, and spaced-apart less than an edge length of a diskette from, each combination of roller and idler means of said one, and each of said first multiplicity of, said plurality of combinations of roller and idler means.

9. Apparatus as in claim 8 wherein each of said plurality of combinations of roller and idler means includes a driven roller and an idler, and each of said second multiplicity of said plurality of combinations of roller and idler means are mounted such that a vector that is perpendicular to the longitudinal, horizontal axis of both of the driven roller and idler is at a selected angle to vertical to direct a diskette received from a combination of roller and idler means aligned horizontally therewith to a different horizontal plane.

10. Apparatus as in claim 8 wherein:
said input hopper means defines at least one hole thereinto through the bottom and the lower portion of the side opposite the side from which each diskette is extracted and received by the transport means; and
said extraction means includes pick means positioned beneath the input hopper means to selectively extend into said at least one hole therein to push the bottom diskette from the stack of diskettes within the input hopper means toward the transport means.

11. Apparatus as in claim 8 wherein said pick means includes:
tongue means in the form of a ramp for lifting the rearmost edge of the diskettes in the stack in the input hopper means as the pick means is extended into the input hopper means through said hole; and
shoulder means affixed to the tongue means along the last portion thereof to be extended into the hole through the input hopper means for contacting the edge of the bottom most diskette pushing it toward the transport means.

* * * * *